April 7, 1970  H. R. MASCHINOT  3,504,587
DIE CUTTING MACHINE FOR LABELS AND THE LIKE
Filed May 14, 1968
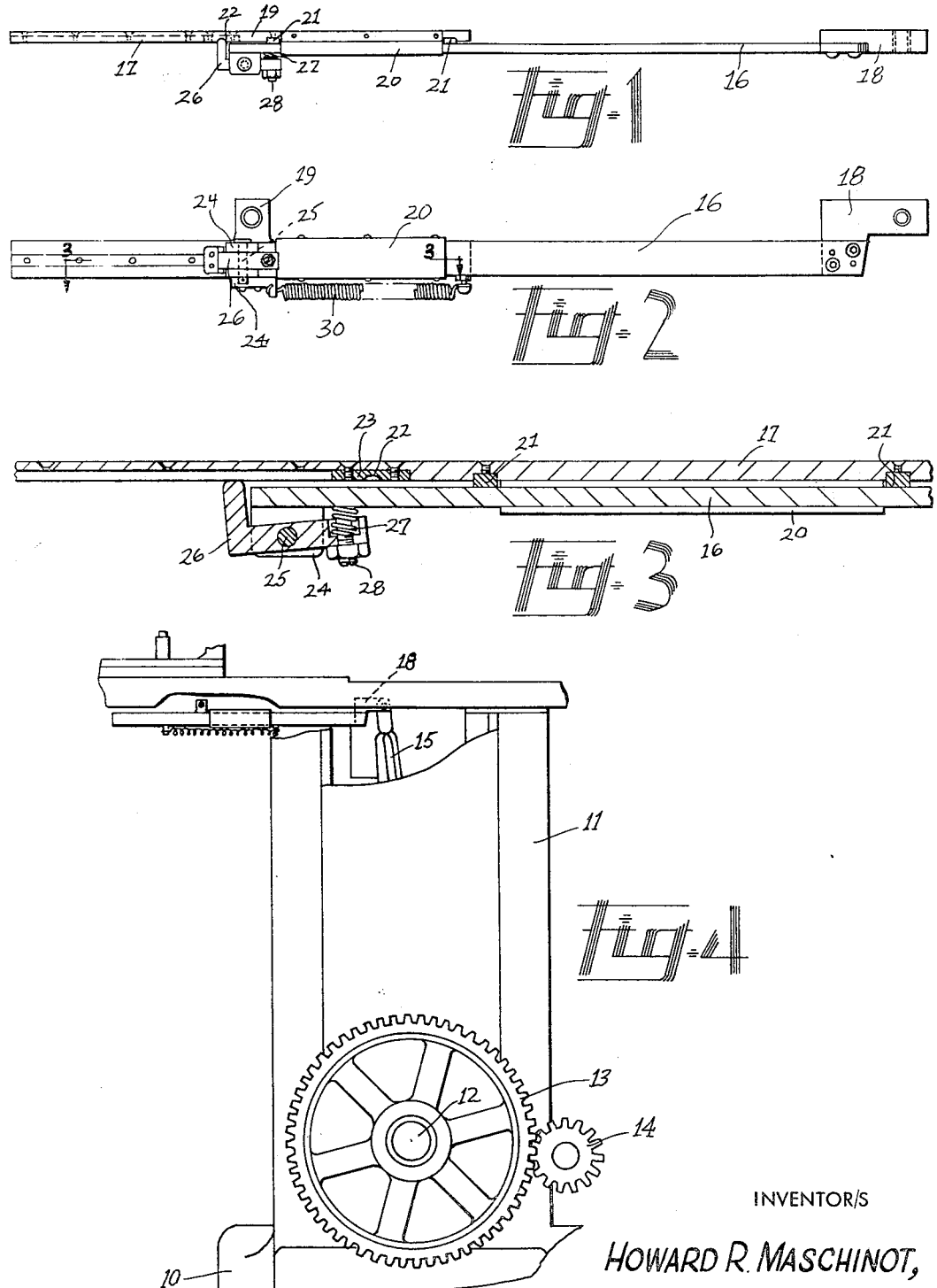
INVENTOR/S
HOWARD R. MASCHINOT,
BY *Melville, Strasser, Foster and Hoffman*
ATTORNEYS

United States Patent Office 3,504,587
Patented Apr. 7, 1970

3,504,587
DIE CUTTING MACHINE FOR LABELS AND THE LIKE
Howard R. Maschinot, Erlanger, Ky., assignor to The Printing Machinery Company, Cincinnati, Ohio, a corporation of Ohio
Filed May 14, 1968, Ser. No. 729,000
Int. Cl. B26d 5/22
U.S. Cl. 83—276                               2 Claims

ABSTRACT OF THE DISCLOSURE

A die cutting machine wherein label feed is accomplished through a cam actuated bell crank connected to a pusher means. The arrangement provides positive action of said cam on said bell crank when moving said pusher means on a return stroke and a spring urged label feeding stroke. A safety connection is provided between the bell crank and the pusher means whereby if the return stroke or the pusher means is obstructde, the bell crank can continue to move without damaging the machine or endangering the operator.

CROSS REFERENCE TO RELATED APPLICATIONS

This application is generally related to the Brestel et al. Patent No. 3,290,977, dated Dec. 13, 1966 and to the copending application of Howard R. Maschinot, Ser. No. 688,166, filed Dec. 5, 1967.

BACKGROUND OF THE INVENTION

The invention is in the field of label die cutting machines wherein a stack of uncut labels is moved by a pusher means from a loading position to a cutting position on an anvil, which anvil is then pushed upwardly against a cutting die. More particularly, the invention relates to the label feeding arrangement for such machines.

Machines in the field to which this invention relates are well known and are disclosed in the above mentioned patent and the copending application above identified. Originally the machines were arranged so that the return stroke of the pusher means resulted from positive action between a cam and a cam follower whereas the feed involved the biasing of the cam follower against the cam. In this way, if an obstruction prevented proper feed of labels to the anvil, damage was prevented.

It was later recognized that the return stroke of the pusher means might be accidentally obstructed and that this too could result in damage to the machine. Thus, in the copending application above referred to the action of the cam and follower was reversed so that the feeding movement was positive and the return movement was spring biased. A safety connection was then provided to take care of a possible obstruction on the feeding stroke. This development is disclosed in the copending application Ser. No. 641,017, now Patent No. 3,455,155.

SUMMARY OF THE INVENTION

The present invention involves a return to the basic arrangement of the Brestel et al. Patent No. 3,290,977 with a spring biased feed stroke and a positive return stroke of the pusher and means are now provided whereby if the pusher is obstructed on its return stroke it may stop while the bell crank and other related mechanism continues to operate. Thus, according to the present invention, safety against machine damage or operator injury is provided on both the feed and return stroke as it is in said copending application but in a different way.

BRIEF DESCRIPTION OF THE DRAWINGS

FIG. 1 is a plan view of the linkage between the bell crank and the pusher means.

FIG. 2 is a front elevational view of the same.

FIG. 3 is a cross sectional view in the same aspect as FIG. 1 on an enlarged scale, showing the operation of the detent upon the occurence of an obstruction; and FIG. 4 is a fragmentary general view of the machine which in all other respects may be the same as shown in the Brestel et al. Patent No. 3,290,977.

Reference may be had to said patent for an understanding of the operation of the parts of the machine not shown or described in detail herein.

DESCRIPTION OF THE PREFERRED EMBODIMENT

The machine of the present invention may be identical or similar to that shown in said Brestel et al. patent. As described therein in more detail, the machine has a base 10 and an upstanding column 11 and is provided with a main shaft 12 driven through gearing 13, 14 from a prime mover. The shaft 12 carries the cams as shown in said Brestel et al. patent and one of the cams operates a bell crank lever, the upper end of which is The pusher means may be identical to the pusher means of the Brestel et al. patent and the mechanism shown in FIGS. 1 to 3 inclusive is used in place of the member 65 of said Brestel et al. patent. It will be understood that with the cam and bell crank arrangement of said Brestel et al. patent, the feed stroke (toward the right in the drawings) is spring biased with the spring urging the cam follower on the short arm of the bell crank against the cam while on the return stroke the cam acts positively on the bell crank to move the pusher mechanism to the left in the several figures.

According to the present invention, the linkage between the bell crank 15 and the pusher mechanism comprises a pair of telescopically arranged bars 16 and 17. The bar 16 at its right hand end is connected by means of the bracket 18 to the upper end of the bell crank lever 15. The bar 17 is connected to the pusher mechanism (not shown) by means of the lug 19. The bar 17 has secured to it a channel member 20 through which the bar 16 passes. Suitable bearing pads 21 are secured to the bar 17 facing the bar 16.

The bar 17 is provided with a part circular notch 22 which may be formed in a hardened plate 23 suitably secured to the bar 17. The end of the bar 16 is provided with a pair of ears 24 which carry a pivot pin 25. Pivoted on the pivot pin 25 is a detent member 26 which has a rounded end which is normally seated in the notch 22. It is spring urged to this position by a small compression spring 27 surrounding a bolt 28 which bolt is secured to the bar 16. A tension spring 30 is provided between the bars 16 and 17.

From the foregoing description, it will be clear that the bars 16 and 17 normally occupy the position of FIGS. 1 and 2 and move together as a unit with the spring 30 and the detent 36 cooperating to hold the parts in this relationship. If on the return stroke movement of the pusher means is obstructed, the bar 17 is stopped but the bar 16 continues to move. This forces the detent 26 to move out of its notch 22 against the pressure of the spring 27 and the bar 16 may then continue on the return stroke against the elongation of the spring 30. On the next feed stroke the spring 30 will bring the parts back to the position of FIGS. 1 and 2. In this way movement of the bar 16 may continue even in the event of an obstruction to movement of the bar 17. Upon removal of the obstruction, of course the spring 30 again will return the parts to the position of FIGS. 1 and 2.

From the foregoing description, it will be understood that safety is provided both on the feeding and return stroke of the machine where the machine has a positive return stroke and a spring biased feeding stroke as in said Brestel et al. patent. It will be understood that modifications may be made without departing from the spirit of the invention and, therefore, no limitation which is not specifically set forth in the claims is intended or should be implied.

The embodiments of the invention in which an exclusive property or privilege is claimed are defined as follows:

1. In a die cutting machine having a table, a powered anvil means operating upwardly from the level of said table against die means whereby to cut a stack of labels located on said anvil, pusher means for pushing a stack of labels placed on said table into position on said anvil, power means for operating said anvil means, a cam driven by said power means, a pivotally mounted bell crank having a short arm carrying a cam follower and a long arm, and a connection between said long arm and said pusher means to reciprocate the same, said cam and bell crank acting positively to effect a return stroke of said pusher means, and a spring means biasing said cam follower against said cam for a feeding stroke of said pusher means; the connection between said long arm and said pusher means including releasable means to permit stoppage of said pusher means while permitting the continuation of the return stroke of said long arm.

2. A machine according to claim 1, wherein the connection between said long arm and said pusher means comprises a pair of telescopingly arranged bars, one connected to said long arm and one connected to said pusher means, a spring urged detent means for maintaining the relative position of said bars during a normal return stroke of said pusher means but adapted to be released upon obstruction of said pusher means on its return stroke, and a tension spring to permit the bar connected to said pusher means to stop while the bar connected to said long arm continues its return stroke.

References Cited

UNITED STATES PATENTS 3,290,977   12/1966   Brestel et al. _____ 83—467

U.S. Cl. X.R.

83—437

F. T. YOST, Primary Examiner